April 1, 1952　　　J. H. LANCOR, JR　　　2,590,875
REGENERATIVE TRACKING APPARATUS
Filed April 30, 1943
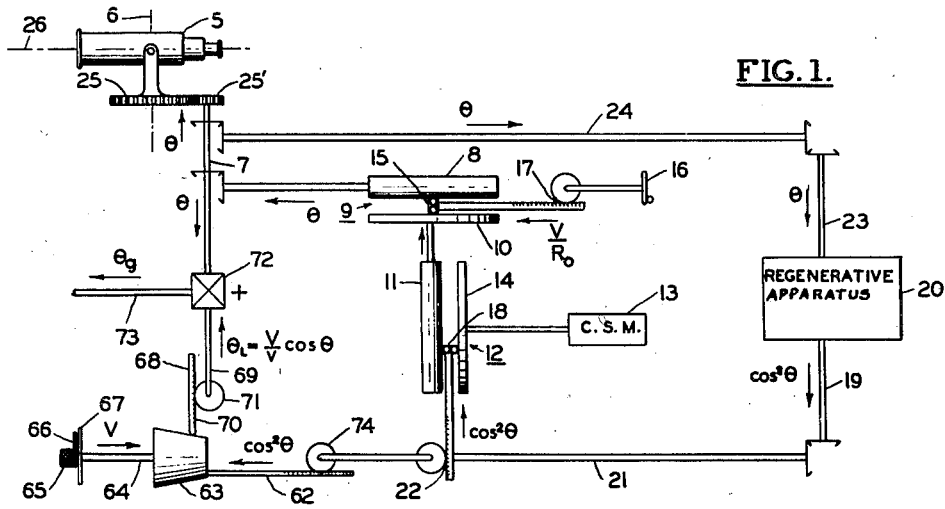
FIG. 1.
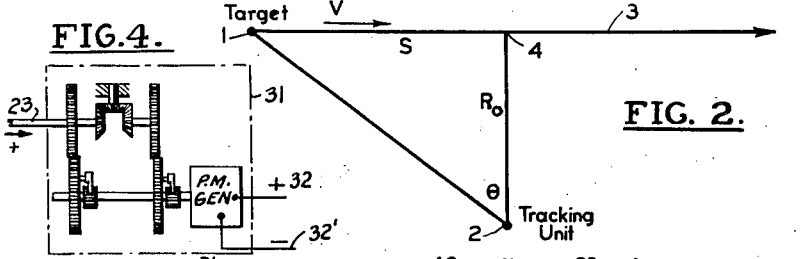
FIG. 4.
FIG. 2.
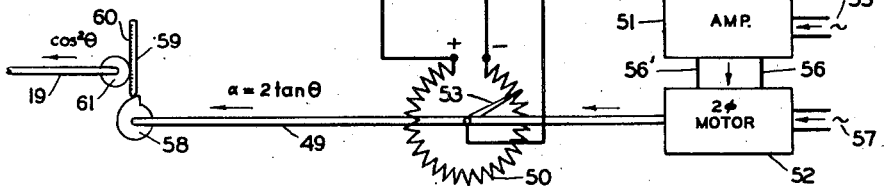
FIG. 3.
INVENTOR,
JOSEPH H. LANCOR, JR.
BY
*Herbert H. Thompson*
HIS ATTORNEY.

Patented Apr. 1, 1952

2,590,875

UNITED STATES PATENT OFFICE 2,590,875

REGENERATIVE TRACKING APPARATUS

Joseph H. Lancor, Jr., East Williston, N. Y., assignor to The Sperry Corporation, a corporation of Delaware Application April 30, 1943, Serial No. 485,261

12 Claims. (Cl. 33—49)

This invention relates generally to the art of fire control. More particularly, the invention discloses improved apparatus for enabling an operator to more easily and more accurately track a target with a sighting device or other comparable instrument. Also, means are disclosed associated with the improved tracking apparatus for determining the angular position of the gun necessary to effect a hit upon the target.

The apparatus and method to be employed for tracking the target constitute a most important consideration in the design of any fire control system. This is true because the ultimate gun position data computed is primarily based upon the input data received from the tracking unit. If inaccuracies exist in the tracking data, these inaccuracies will be reflected in magnified form in the computed gun position data. Therefore, it is essential that apparatus be provided to enable the operator to track the target with extreme accuracy.

Another requirement arising from the necessity of accurate input data to the computing mechanism is that the tracking device be simple and easy to operate. Obviously, the ease of tracking will have a direct effect upon the accuracy of the operation. In some fire control systems also, the tracking operator is required to simultaneously make other adjustments and settings not directly related to the tracking operation. The accuracy and efficiency with which he can accomplish his other duties will also be affected by the ease or difficulty of operation of the tracking apparatus.

In the novel tracking apparatus of the present invention the difficulties ordinarily involved in tracking the target are reduced to a minimum, and the accuracy of the operation is increased by eliminating to a large extent the "human element" from the operation. In order to accomplish this, a "rate" tracking system is provided, that is, one in which the angular position of the tracking device is controlled by adjusting its angular rate of movement. In prior tracking devices of the "rate" type, the adjustment of the angular rate was completely under the control of the operator. In the present invention, however, this rate adjustment is in effect obtained from two component adjustments, one of these component adjustments being under the control of the operator, while the other component is under the control of a computing mechanism.

When the target is first being tracked, the major portion of the rate adjustment is effected by the operator. However, as the tracking operation continues, the major portion of the rate adjustment is taken over by the computer, until eventually the target is being tracked completely by the computer and the operator need only compensate for changes in the course or speed of the target's motion.

Accordingly, the primary object of the present invention is to provide means for accurately and easily tracking a target.

Another object of the present invention is to provide a rate tracking control wherein a computer continuously and automatically adjusts the rate of tracking to thereby aid the operator.

Still another object of the invention is to provide a rate tracking control wherein after the operator has initially tracked the target for a short time, accurate tracking is continuously and automatically maintained without further adjustment by the operator.

An object of the invention is to provide regenerative tracking apparatus.

Another object of the invention is to provide simple and novel means for determining the angular position of a gun necessary for effective gunfire.

Other objects and advantages will become apparent from the specification, taken in connection with the accompanying drawings wherein one embodiment of the invention is illustrated.

In the drawings,

Fig. 1 is a schematic representation of the novel tracking control apparatus of the present invention.

Fig. 2 is a spatial diagram useful in explaining the theory of the invention.

Fig. 3 is a schematic representation and wiring diagram of the regenerative computer of Fig. 1.

Fig. 4 is a schematic representation of the unidirectional drive mechanical coupling of the permanent magnet generators, 31 and 48, of Fig. 3.

Similar characters of reference are used in all of the above figures to indicate corresponding parts. Arrows are employed to indicate the direction of flow of information or control influence.

Referring to Fig. 2, the theory of operation of the invention will first be developed. Fig. 2 may be considered as a plan view looking down upon a horizontal plane containing the target 1 and the tracking unit 2, and in which plane the target is assumed as moving at a constant velocity V along a straight line 3. In the figure, $r$ represents the instantaneous range to the target, $R_0$ represents the cross-over range, and S is the distance from the present position of the target to the cross-over point 4. $\theta$ is the angle between the cross-over range line and the present line of sight.

From the geometry of the figure it is apparent that $$S = R_0 \tan \theta \qquad (1)$$

Differentiating Equation 1 in order to obtain an expression for the velocity V, we obtain $$\frac{dS}{dt} = V = R_0 \sec^2 \theta \frac{d\theta}{dt} \qquad (2)$$

And solving Equation 2 for the angular rate $$\frac{d\theta}{dt}$$

we get $$\frac{d\theta}{dt} = \frac{V}{R_0} \cos^2 \theta \qquad (3)$$

In Equation 3 it will be noted that under the conditions assumed, that is, with the target having a constant velocity and direction of motion, both V and $R_0$ are constants, the only variable appearing in the equation being $\cos^2 \theta$. In the overall adjustment of the angular rate of tracking $$\frac{d\theta}{dt}, \frac{V}{R_0}$$

forms the previously referred to component which is under the control of the operator, whereas $\cos^2 \theta$ forms the component under the control of the computer. Thus it is seen that while the target maintains its course and speed, the $$\frac{V}{R_0}$$

component set in by the operator will be constant, and when once set correctly will not need to be changed unless and until a change occurs in the target's course or speed.

In order to understand the method by which the computer solves for the $\cos^2 \theta$ component, a further mathematical analysis is necessary. Thus, differentiating Equation 3 we obtain $$\frac{d^2\theta}{dt^2} = -2\frac{V}{R_0} \sin \theta \cos \theta \frac{d\theta}{dt} \qquad (4)$$

And diving Equation 4 by Equation 3 the following relationship is obtained:

$$\frac{\frac{d^2\theta}{dt^2}}{\left(\frac{d\theta}{dt}\right)^2} = -2 \tan \theta \qquad (5)$$

From Equation 5 it is apparent that suitable computing mechanism can be provided to continuously solve for $\theta$ in terms of rate of rotation of shaft 23 and acceleration thereof, and therefore for $\cos^2 \theta$, once correct tracking has been initiated by the operator and data corresponding thereto is set into the computing mechanism.

Referring now to Fig. 1 wherein regenerative tracking control apparatus based on the foregoing theory is disclosed, there is shown a sighting device 5, which is herein illustrated as a sighting telescope, but which may be any suitable apparatus adapted to define a line of sight 26. Sighting device 5 may be rotated about an azimuth axis 6 from shaft 7 through gearing 25, 25'.

Shaft 7 is shown as driven from a cylinder 8 of a variable speed device 9, the disc 10 of which in turn is driven from a cylinder 11 of a second variable speed device 12. A constant speed motor 13 actuates the disc 14 of the second variable speed device 12 at a constant rate. Both variable speed devices 9 and 12 are of the usual type in which the cylinders 8, 11 are driven at a rate proportional to the speed of drive discs 10, 14, and also proportional to the displacement of their ball carriages 15, 18 from a central position. It will be apparent therefore that cylinder 8 and sighting device 5 will be driven at an angular rate proportional to the settings of each of the ball carriages 15, 18.

Ball carriage 15 of variable speed drive 9 may be adjusted by the operator by rotation of handwheel 16, which rotation acts through rack and pinion 17 to laterally displace ball carriage 15. Ball carriage 18 of variable speed device 12 is actuated in accordance with the angular displacement of output shaft 19 from the regenerative apparatus 20 through shaft 21 and rack and pinion 22. Data corresponding to the angular displacement $\theta$ of sighting device 5 is introduced into the computer as a proportional rotation of input shaft 23 through shafts 7 and 24 and the associated gearing.

In operation, let it first be assumed that the operator is attempting to track a target having a constant speed and course, and that the ball carriage 18 of variable speed device 12 is initially set at any arbitrary position. With such a setting, cylinder 11 and drive disc 10 will rotate at a corresponding constant speed. Accordingly, it is possible for the operator to continuously adjust the position of ball carriage 15 to whatever displacement is required to produce a rotation of cylinder 8 and sighting device 5 at the proper angular rate to track the target. Thus, initially the target will be correctly tracked through the operation of the operator's handwheel 16, and the angular displacement of sighting device 5 will be continuously transmitted to the regenerative apparatus 20, as on shaft 23.

The regenerative apparatus 20, which will hereinafter be described in detail, is adapted to take the first and second time derivatives of the angular displacement of input shaft 23 and to compute therefrom $\tan \theta$, in accordance with Equation 5. $\cos^2 \theta$ is then derived from $\tan \theta$ and is produced as a proportional rotation of output shaft 19. Ball carriage 18 of variable speed device 12 is then repositioned in accordance with $\cos^2 \theta$ from shaft 19, thereby changing the speed of rotation of drive disc 10 and tending to change the speed of rotation of cylinder 8 and sighting device 5.

With the new speed of rotation of drive disc 10 thus produced, the operator will find it necessary to readjust the displacement of ball carriage 15 in accordance with the true value of $$\frac{V}{R_0}$$

in order to maintain the line of sight on the target. When ball carriage 15 has finally been positioned in accordance with the true constant value of $$\frac{V}{R_0}$$

no further adjustment by the operator will be necessary, assuming the target maintains the same speed and course, since the regenerative apparatus 20 will continuously vary the displacement of ball carriage 18 in accordance with the true value of $\cos^2 \theta$, thereby continuously varying the rate of rotation of cylinder 8 and sighting device 5 as required in order to track the target.

Should the target change its course or speed, the values of V and $R_0$ would change and the setting of ball carriage 15 would therefore be in error. As a result, the line of sight defined by sighting device 5 would begin to move off of the target. Accordingly, the operator would have to readjust his handwheel 16 in order to maintain the sighting device directed toward the target, thereby repositioning ball carriage 15 at a position corresponding to the new value of $$\frac{V}{R_0}$$

It will be apparent that suitable limit stops (not shown) must be provided for ball carriage 18 to prevent it from ever being positioned at zero displacement, since at such a position drive disc 10 would be stationary and the operator would be unable to track the target initially.

Referring now to Fig. 3, there is shown in detail the regenerative apparatus 20, the function of which it will be recalled, is to continuously receive data corresponding to the angular orientation $\theta$ of the sighting device 5 as a proportional rotation of input shaft 23, and to solve therefrom and produce on its output shaft 19 an angular displacement proportional to $\cos^2 \theta$.

As schematically shown, a permanent magnet generator 31 is actuated from input shaft 23. There is thus produced across its output leads 32, 32' a voltage proportional to the rate of change or first time derivative $$\frac{d\theta}{dt}$$

of the angular displacement $\theta$. Permanent magnet generator 31 should be of the type wherein a change of direction of rotation of its input shaft 23 does not effect a change in polarity of the output voltage appearing on leads 32, 32'. In other words, lead 32 should always be of the same polarity with respect to lead 32', shown in the drawing as positive, irrespective of the direction of rotation of shaft 23. If desired, this unchanging polarity may be obtained by a double ratchet arrangement introduced in the mechanical shafting of the permanent magnet generator as shown in Fig. 4, so that the generator rotor shaft will always have the same direction of rotation irrespective of the direction of rotation of sighting device 5 and shaft 23.

As indicated in Fig. 4, a 1:1 ratio reversing gear system is used with two ratchets arranged for driving the generator in only one direction. Preferably the housing for the permanent magnet generator may be made sufficiently large to include the ratchet system as well as the generator permanent magnet field and armature elements.

A follow-up system is provided in order to angularly displace shaft 33 an amount proportional to the voltage appearing across leads 32, 32' that is, proportional to $$\frac{d\theta}{dt}$$

For this purpose a linearly wound potentiometer 34 is energized from a constant source of direct voltage shown as a battery 35, the negative end of which is connected to lead 32'. Making contact with potentiometer 34 is a movable contact arm 36 which is actuated in accordance with the displacement of shaft 33. Accordingly, there will be produced between lead 32' and lead 37, which is electrically connected to arm 36, a voltage proportional to the displacement of shaft 33.

As shown, this voltage is placed in series opposition with the voltage across leads 32, 32'. The resultant direct current voltage is fed to an amplifier 39 having a constant source of alternating current input 40. Amplifier 39 is of the conventional design, adapted to produce across its output leads 41, 41' an alternating voltage of amplitude and phase corresponding to the magnitude and polarity of the input direct voltage received across leads 32, 37. Such an amplifier is shown in Fig. 4 of Patent 1,664,455. Terminals designated "D. C. input circuit" in the above patent are suitable for connection in the present case to conductors 32 and 37. The terminals labeled "A. C. output circuit" are suitable for connection in this case to output conductors 41 and 41'. An alternating current source is schematically indicated in the common anode supply of the two tubes in Fig. 4 of the above patent. This source corresponds to the alternating current source designated 40 in Fig. 3. This alternating current output signal voltage is then employed to control the direction and speed of operation of a conventional two-phase motor 38 by being applied to one phase winding of the motor, the other phase winding being constantly energized from a constant alterntaing current source 42, which may be synchronized with source 40, and preferably is common therewith. The output shaft 43 of motor 38 is then connected to drive shaft 33, thereby rotating contact arm 36 in such a direction as to reduce to zero the voltage appearing across leads 32, 37 and applied to amplifier 39.

It will be apparent, therefore, that motor 38 will continue to drive contact arm 36 until it reaches such a position that the voltage across leads 37, 32' is just equal to that across leads 32, 32'. The voltage across leads 37, 32' will then be proportional to $$\frac{d\theta}{dt}$$

and since this voltage is also proportional to the angular displacement of shaft 33, the displacement of shaft 33 must also be proportional to $$\frac{d\theta}{dt}$$

In order to get a voltage proportional to $$\left(\frac{d\theta}{dt}\right)^2$$

a second potentiometer 44, preferably having much higher resistance than potentiometer 34, is provided having its contact arm 46 also positioned from shaft 33, and therefore positioned proportionately to $$\frac{d\theta}{dt}$$

Potentiometer 44 is energized from a voltage proportional to $$\frac{d\theta}{dt}$$

as by connecting its opposing terminals to leads 37 and 32', as shown. Therefore, the voltage appearing between lead 45, which is electrically connected to movable contact arm 46 and lead 45', which is connected to the negative terminal of the potentiometer, is proportional to $$\left(\frac{d\theta}{dt}\right)^2$$

In order to obtain a voltage corresponding to $$\frac{d^2\theta}{dt^2}$$

across leads 47, 47', a second permanent magnet generator 48 is provided, this generator being actuated in accordance with $$\pm\frac{d\theta}{dt}$$

from shaft 43. Generator 48 is also of the type in which the polarity of the output voltage does not reverse with direction of rotation of input shaft 43. This generator unit may embody a reversing gear and ratchet mechanism similar to that shown in Fig. 4.

In order to produce an angular displacement of shaft 49 proportional to 2 tan $\theta$, a second follow-up system comprising potentiometer 50, amplifier 51, and two-phase motor 52 is provided, this follow-up system acting similarly to the system previously described for displacing shaft 33 an amount proportional to $$\frac{d\theta}{dt}$$

As shown, potentiometer 50, preferably having much higher resistance than potentiometer 44, is energized in accordance with $$\left(\frac{d\theta}{dt}\right)^2$$

from leads 45, 45', and has a movable contact arm 53 actuated from shaft 49. There will thus be produced across lead 45' and lead 54, which is electrically connected to contact arm 53, a voltage proportional to the angular position $\alpha$ of shaft 49 and also to the voltage across leads 45, 45'. This voltage, which will therefore be proportional to $$\alpha\left(\frac{d\theta}{dt}\right)^2$$

is then placed in series opposition with the voltage corresponding to $$\frac{d^2\theta}{dt^2}$$

appearing across leads 47, 47', and the resultant voltage is applied to amplifier 51. This amplifier may be similar to that designated 39, for which reference is made to Fig. 4 of Patent 1,664,455.

Amplifier 51, which has a constant source of alternating current input 55, produces on its output leads 56, 56' an alternating output voltage corresponding in amplitude and phase to the magnitude and polarity of the direct input voltage received on leads 47, 54. The voltage appearing across output leads 56, 56' is applied to one phase of the two-phase motor 52, which has its other phase constantly energized from a suitable alternating current source 57. Preferably, a common alternating current source is provided for the circuits designated 55 and 57. Output shaft 49 of motor 52 will thus be caused to rotate at a velocity corresponding to the magnitude of the signal voltage appearing across leads 47, 54, and in such a direction as to reduce the signal voltage to zero. Shaft 49 will therefore continue to rotate movable contact arm 53 until the voltage appearing across leads 54, 47' is just equal to that appearing across leads 47, 47'.

When this condition has been reached, we can set up the following equation involving the angular displacement $\alpha$ of shaft 49:

$$\alpha\left(\frac{d\theta}{dt}\right)^2 = \frac{d^2\theta}{dt^2} \qquad (6)$$

Solving Equation 6 for $\alpha$ and combining with Equation 5, we obtain $$\alpha \frac{\frac{d^2\theta}{dt^2}}{\left(\frac{d\theta}{dt}\right)^2} = -2 \tan \theta \qquad (7)$$

Therefore, when the follow-up system has reached equilibrium the angular displacement of shaft 49 is proportional to tan $\theta$, the minus sign appearing in the equation affecting only the direction of rotation of shaft 49.

Shaft 49 angularly displaces a cam 58, which is so designed that its follower 59 is thus displaced by an amount proportional to $\cos^2 \theta$. There are provided on follower 59 rack teeth 60, which cooperate with pinion 61 to angularly displace output shaft 19 by an amount also proportional to $\cos^2 \theta$.

Although a specific apparatus 20 for obtaining $\cos^2 \theta$ has been disclosed for the sake of definiteness and completeness in the description, it will be understood that any number of suitable apparatuses could be designed for carrying out the necessary steps in the computation. It is contemplated, therefore, that any suitable computing mechanism could be employed without departing from the scope of the invention as embodied in the principles described.

There is also disclosed in Fig. 1 means for employing data already obtained in the regenerative apparatus 20 to obtain the prediction lead angle $\theta_L$, and also the angular position of the gun $\theta_G$ necessary to effect a hit. Simple angular rate-by-time predicting apparatus employs the following formula to obtain the prediction angle $\theta_L$:

$$\theta_L = \frac{r}{v}\frac{d\theta}{dt} \qquad (8)$$

wherein $v$ is a predetermined average projectile velocity. The projectile velocity remains substantially constant over a range of fire of the order of 500 to 2,000 yards. Typical variations of speed of a projectile might be 3,100 feet per second muzzle velocity to 2,900 feet per second velocity immediately prior to impact. Thus, an assumption of 3,000 feet per second average velocity would introduce only minor error for an appreciable variation of target range. The above equation shows the prediction angle, $\theta_L$, as a function of two terms, the first of which, $$\frac{r}{v}$$

represents the time required for the projectile to reach the point of impact, and the second of which, $$\frac{d\theta}{dt}$$

represents the angular rate of the sighting device 5 about axis 6. From the geometry of Fig. 2 we can write the equation $$r = \frac{R_0}{\cos \theta} \qquad (9)$$

Substituting Equations 3 and 9 in Equation 8, we obtain the following expression for the prediction angle:

$$\theta_L = \frac{V}{v} \cos \theta \qquad (10)$$

The predicting apparatus of Fig. 1 employs this formula to solve for the prediction angle $\theta_L$.

As shown, shaft 21 operates through a pinion 74 to laterally displace a rack member 62 an amount proportional to $\cos^2 \theta$. Rack member 62 is connected to laterally displace the three-dimensional cam 63 by a corresponding amount.

Cam 63 is angularly displaced by an amount corresponding to the target velocity V from shaft 64. For this purpose, a knob 65 is provided to actuate shaft 64 and pointer 66, which cooperates with a fixed scale 67. An operator then positions knob 65 and also cam 63 in accordance with the estimated target velocity V. Obviously, in a more elaborate system wherein the range $r$ is measured, V could be computed and automatically set in on shaft 64.

Three-dimensional cam 63 is so designed that when it is rotated by an amount corresponding to target velocity V and laterally displaced by an amount corresponding to $\cos^2 \theta$, its follower 68 is laterally displaced by an amount corresponding to the prediction lead angle $\theta_L$ in accordance with Equation 10. Since $v$ is a constant in a given installation, three-dimensional cam 63 operates in accordance with two variables, V and $\cos^2 \theta$, to deliver a solution $\theta_L$, a variable dependent on the first two. Lateral displacement of follower 68 is converted to a corresponding angular displacement of shaft 69 through rack teeth 70 and pinion 71.

A differential 72 is provided having one input member actuated from shaft 7 in accordance with the angular displacement $\theta$ of the sighting device 5, and having another input member actuated from shaft 69 in accordance with the prediction lead angle $\theta_L$. There is thus produced on output shaft 73 an angular displacement corresponding to the sum of the displacements of the two input shafts, and therefore corresponding to the required gun angular position $\theta_G$ in accordance with the equation $\theta_G = \theta + \theta_L$. Shaft 73 may then be used to actuate a suitable electrical transmitter in order to transmit gun data to a remote gun battery, or it may be used to position local guns either directly or through a power follow-up system.

It has been stated that the angle $\theta$, which was defined in the theoretical discussion, and shown in Fig. 2, as the angular displacement of sighting device 5 and the line of sight 26 with respect to the cross-over range line, is transmitted from the sighting device to the regenerative apparatus 20. However, since the computer only employs the time rate of change of this data, the angle actually transmitted may be taken with respect to any zero reference line which is convenient instead of with respect to the cross-over range line without in any way adversely effecting the operation of the device.

For convenience in explaining the basic theory of operation of the invention, a sighting device and associated equipment operating in only one plane, namely, azimuth, has been described. It will be apparent that the principles of operation of the device are fundamental, and may be readily applied by one skilled in the art to tracking in any plane or in any two planes, such as elevation and azimuth, simultaneously. Also, if desired, a pure displacement control, actuating the sighting device through a differential, could also be employed in conjunction with the rate control described.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Fire control apparatus comprising a rotatable device for defining a line of sight to a target, a computing mechanism including means for continuously receiving a measure of the angular position of said device, means responsive to the time rate of variations in said received measure of angular position for computing a measure in $\tan \theta$ in accordance with the formula $$\frac{\frac{d^2\theta}{dt^2}}{\left(\frac{d\theta}{dt}\right)^2} = 2 \tan \theta$$

wherein $\theta$ represents the angular position of said device with respect to the cross-over range line, and means responsive to said computed measure of $\tan \theta$ for obtaining a measure of $\cos^2 \theta$, and means for driving said device at a rate proportional to said computed measure of $\cos^2 \theta$.

2. Apparatus as claimed in claim 1, wherein said last-named means includes a manually operable member for adjusting the proportionality factor relating said measure of $\cos^2 \theta$ to the output rate.

3. Fire control apparatus comprising a sighting device, first means continuously responsive to the angular position of said device for determining the first time derivative $$\frac{d\theta}{dt}$$

of said angular position, second means responsive to said first means for determining the square $$\left(\frac{d\theta}{dt}\right)^2$$

of said first derivative, third means responsive to said first means for determining the second time derivative $$\left(\frac{d^2\theta}{dt^2}\right)$$

of said angular position, fourth means responsive to said second and third means for determining $\tan \theta$, and means responsive to said fourth means for determining $\cos^2 \theta$, $\theta$ representing the angular position of said device with respect to the cross-over range line of the target being tracked by said device.

4. Apparatus as claimed in claim 3, further including variable speed means for driving said device, and means responsive to said $\cos^2 \theta$ determining means for adjusting said variable speed driving means to a rate proportional to said determination of $\cos^2 \theta$.

5. Apparatus as claimed in claim 3, further including variable speed motive means for driving said device and means responsive to said $\cos^2 \theta$ determining means for adjusting said variable speed driving means to a rate proportional to said determination of $\cos^2 \theta$, and manually operable means associated with said variable speed motive means for adjusting the proportionality factor relating said measuring of $\cos^2 \theta$ to the output rate.

6. Apparatus as claimed in claim 3, further including means adjustable according to the linear velocity V of the target and also responsive to said last means for determining the lead angle $\theta_L$ by which guns must be offset from the angular position of said sighting device in order to hit the target.

7. Apparatus as claimed in claim 3, further including means responsive to the last means recited in claim 3 for driving said device at a rate proportional to $\cos^2 \theta$, a manually operable member for adjusting the proportionality factor relating $\cos^2 \theta$ to the output rate, further means responsive to the last means recited in claim 3 and adapted to be adjusted according to the target velocity V for determining therefrom a measure of the prediction lead angle $\theta_L$.

8. Fire control apparatus comprising a rotatable device for defining a line of sight to a target and a computing mechanism, said mechanism including means for continuously receiving a measure of the angular speed of said device, and means responsive to the time variations in said angular speed for computing a measure of $\cos^2 \theta$, $\theta$ representing the angular position of said device with respect to the cross-over range line, and means responsive to said computed measure of $\cos^2 \theta$ for driving said device at a proportional rate.

9. Apparatus for automatically tracking an object moving at uniform speed in a straight line, comprising a rotatable device for defining a line of sight to an object, means including a manually adjustable variable speed drive and a further variable speed drive connected in cascade relation between a constant speed motor and said device for driving said device at an adjustable rate, means responsive to the changes of speed of said device and independent of the displacement of said device and operatively connected to said further variable speed drive to vary the speed thereof for maintaining said device aligned with said object.

10. Apparatus for producing an electric output signal varying as the acceleration of a first movable object, comprising means coupled to said object for producing a first signal varying as the velocity of said object, a second movable object, means for producing a second signal varying in accordance with the displacement of said second movable object, means jointly responsive to said first and second signals for positioning said second movable object according to the difference of said first and second signals, whereby the displacement of said second movable object varies according to the velocity of movement of said first movable object, and means responsive to the movement of said second movable object for producing an output signal varying as the velocity of movement of said second object and accordingly as the acceleration of said first movable object.

11. Control apparatus as claimed in claim 10 having a third movable element, means producing a signal varying with the position thereof, and means responsive to the difference of said acceleration signal and said last-named signal for driving said third element.

12. Target tracking apparatus comprising a sighting device arranged to be aligned toward a target, means coupled to said device and continuously responsive to the angular position of said device for providing an output representing the first time derivative $$\frac{d\theta}{dt}$$

of said angular position, first means coupled to said angular position responsive means and responsive to the output thereof for providing an output representing the square $$\left(\frac{d\theta}{dt}\right)^2$$

of said first time derivative, second means coupled to said angular position responsive means and responsive to the output thereof for providing an output representing the second time derivative $$\left(\frac{d^2\theta}{dt^2}\right)$$

of said angular position, means coupled to said first and second means and jointly responsive to the outputs thereof for providing an output representing $\tan \theta$, and means coupled to said jointly responsive means and responsive to the output thereof for providing an output representing $\cos^2 \theta$, $\theta$ repesenting the angular position of said device with respect to the crossover range line of the target tracked by said device.

JOSEPH H. LANCOR, JR.

REFERENCES CITED

The following references are of record in the file of this patent:

UNITED STATES PATENTS

| Number | Name | Date |
| --- | --- | --- |
| 1,345,700 | Routin | July 6, 1920 |
| 1,464,208 | Makaroff | Aug. 7, 1923 |
| 1,831,595 | Gray | Nov. 10, 1931 |
| 1,849,611 | Bussei | Mar. 15, 1932 |
| 2,071,424 | Papello | Feb. 23, 1937 |
| 2,105,985 | Papello | Jan. 18, 1938 |
| 2,113,436 | Williams | Apr. 5, 1938 |
| 2,200,130 | Lewis et al. | May 7, 1940 |
| 2,414,102 | Hull et al. | Jan. 14, 1947 |
| 2,433,006 | Weiss | Dec. 23, 1947 |